United States Patent [19]

Schlienger et al.

[11] Patent Number: 4,510,368

[45] Date of Patent: Apr. 9, 1985

[54] HIGH SPEED ELECTRIC ARC SAW AND METHOD OF OPERATING SAME

[75] Inventors: Max P. Schlienger, Ukiah; Whalun Szeto, Novato, both of Calif.

[73] Assignee: Retech, Inc., Ukiah, Calif.

[21] Appl. No.: 793,991

[22] Filed: May 5, 1977

[51] Int. Cl.³ .................................. B23P 1/02
[52] U.S. Cl. .................. 219/69 M; 219/68; 219/69 E; 219/69 G; 219/69 D
[58] Field of Search ............ 219/69 W, 69 V, 69 E, 219/69 D, 69 G, 69 M, 69 C, 69 R, 68, 70; 83/72, 169, 471.3, 473, 477.1, 676, 542; 137/209, 576

[56] References Cited

U.S. PATENT DOCUMENTS

| | | | |
|---|---|---|---|
| Re. 20,035 | 7/1936 | Strobel | 219/69 V |
| 2,818,491 | 12/1957 | Matulaitis | 219/69 G |
| 3,035,150 | 5/1962 | Connoy | 219/69 W |
| 3,176,455 | 4/1965 | Buchanan | 83/676 |
| 3,392,255 | 7/1968 | Rye et al. | 219/68 |
| 3,531,615 | 9/1970 | Zammit | 219/69 G |
| 3,806,691 | 4/1974 | Roach | 219/69 G |
| 3,923,086 | 12/1975 | Spohn | 83/471.3 |
| 3,936,653 | 2/1976 | Bals | 219/68 |
| 3,955,062 | 5/1976 | Schlienger | 219/68 |
| 3,963,893 | 6/1976 | Roach | 219/69 R |
| 4,002,885 | 1/1977 | Bell et al. | 219/69 W |
| 4,046,984 | 9/1977 | Vial | 219/69 E |
| 4,047,655 | 9/1977 | McCafferty | 137/209 |
| 4,088,032 | 5/1978 | O'Connor | 219/69 E |

FOREIGN PATENT DOCUMENTS

| | | | |
|---|---|---|---|
| 761752 | 11/1951 | United Kingdom | 219/69 R |
| 396226 | 5/1971 | U.S.S.R. | 219/69 D |

Primary Examiner—Clifford C. Shaw
Attorney, Agent, or Firm—Townsend and Townsend

[57] ABSTRACT

An electric arc saw and a method for operating the saw for cutting or slitting metallic objects by melting a narrow kerf into the object. The method provides for determining the minimum threshold current that is necessary to initiate the cutting operation. The normal cutting current exceeds the threshold current and during the cutting operation the blade is advanced through the object at a speed which is continuously monitored and varied as required to maintain the current flow between the blade and the object substantially constant. The arc saw is constructed so that cuts in three mutually perpendicular directions can be made. The blade is mounted to a vertically disposed, hollow piston that reciprocates in a cylinder mounted to and movable along a cross-head. The piston can be pivoted about its axis to align the blade with the different cutting directions. Electric busbars and power lines for rotating the blade extend through the hollow interior of the piston. The blade itself is relatively thin and slightly dished-in so that it assumes a flat configuration during operation.

44 Claims, 12 Drawing Figures

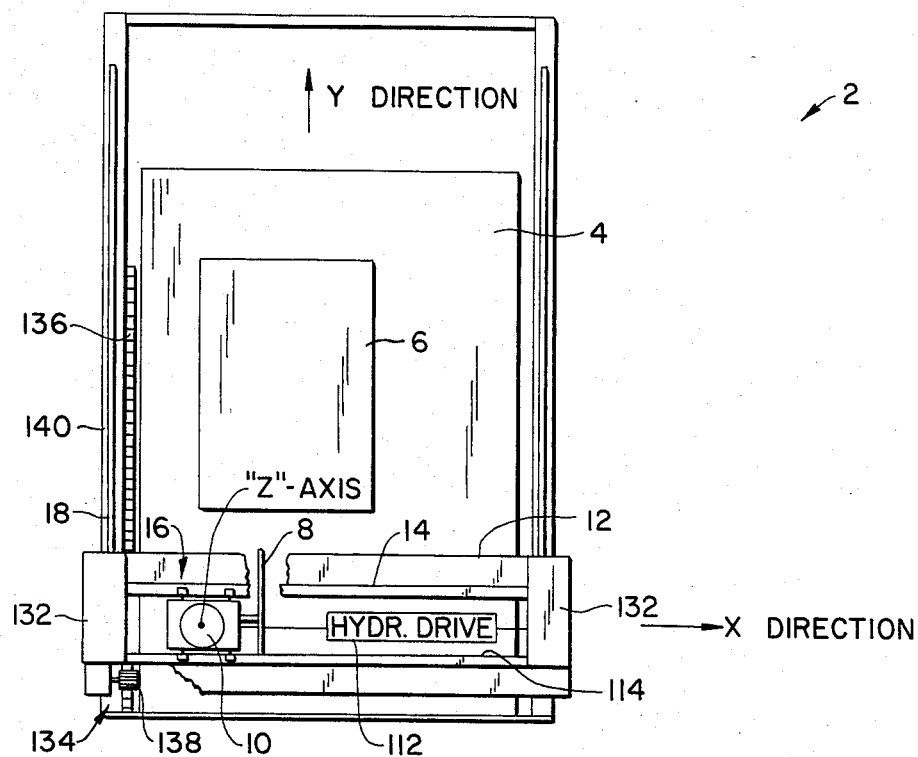
FIG._1.
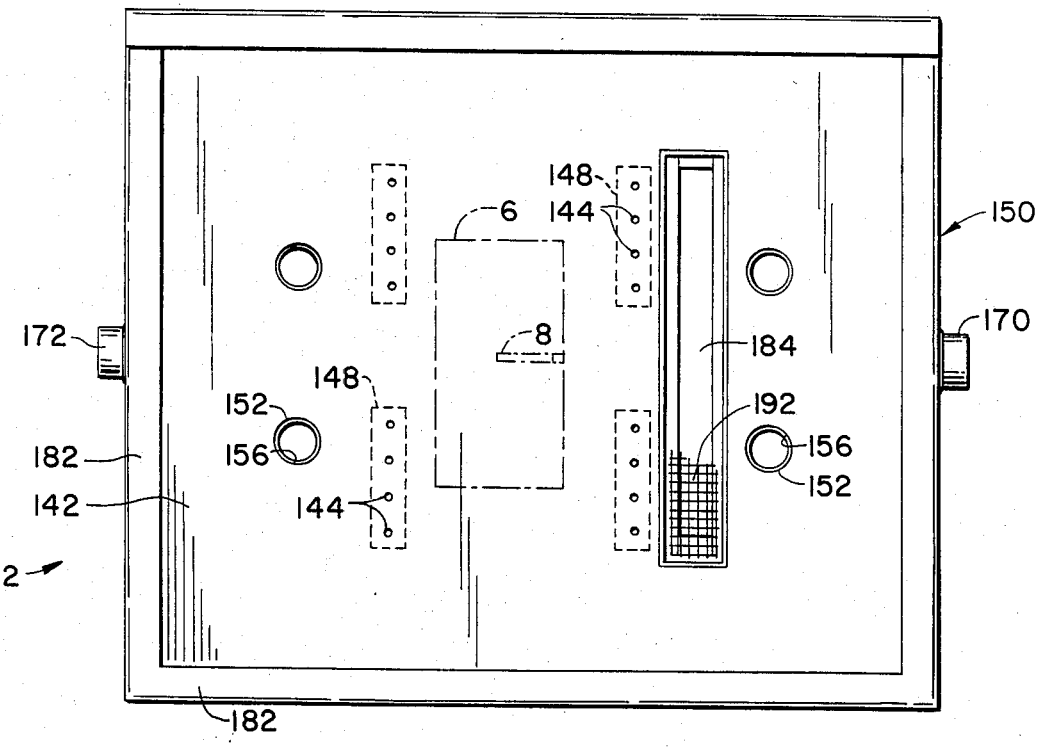
FIG._2.

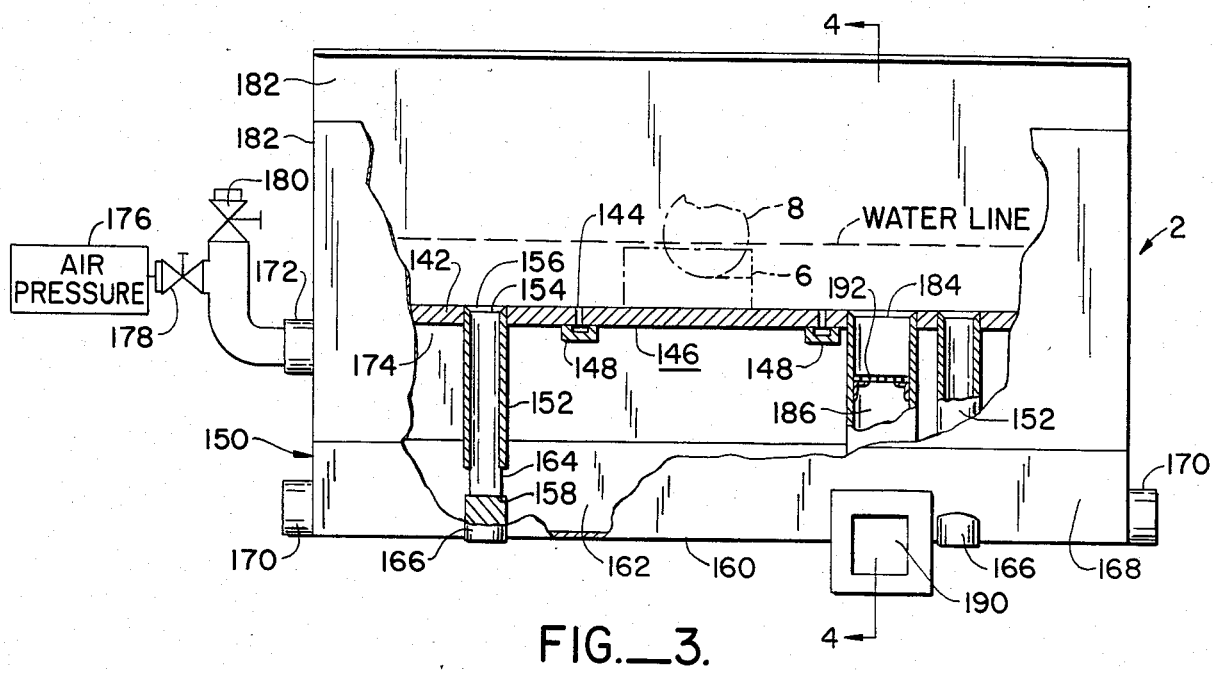
FIG._3.
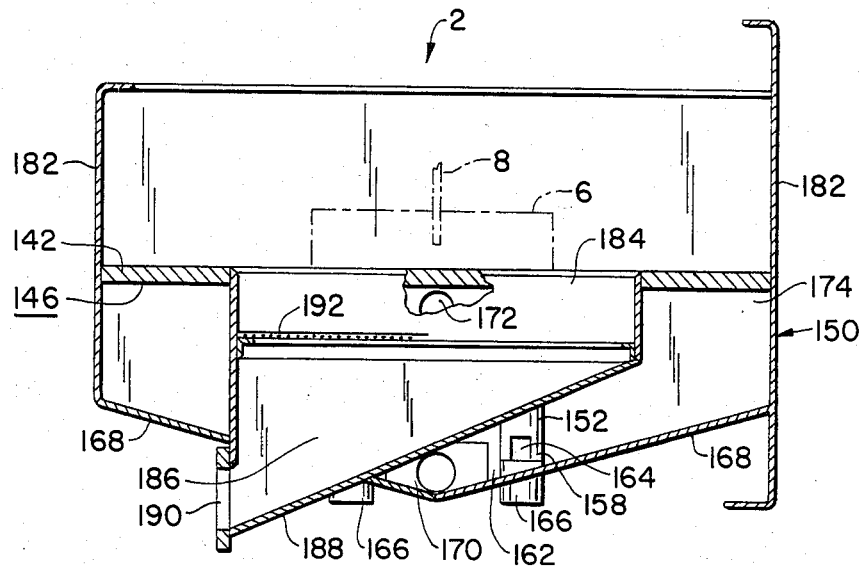
FIG._4.

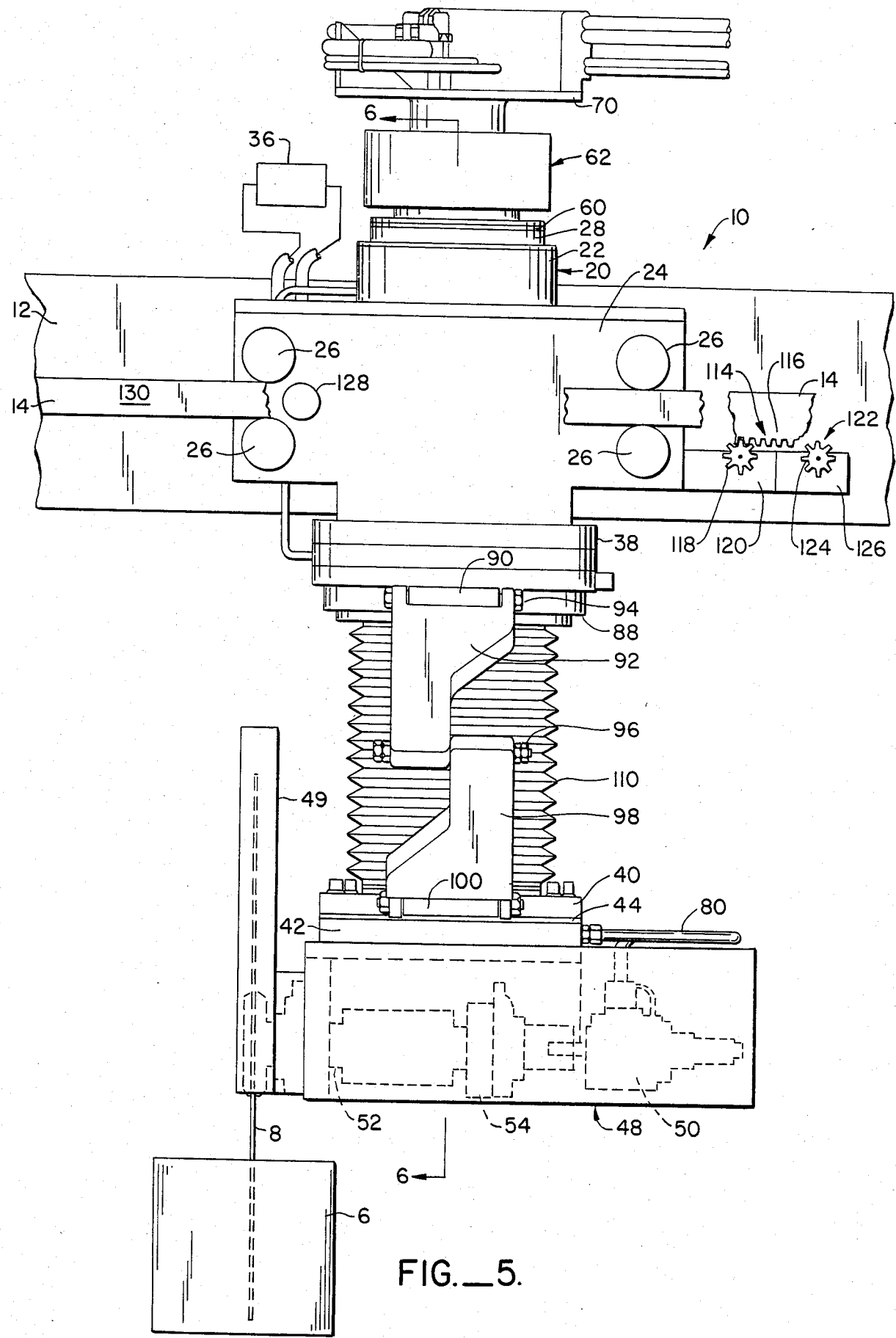
FIG._5.

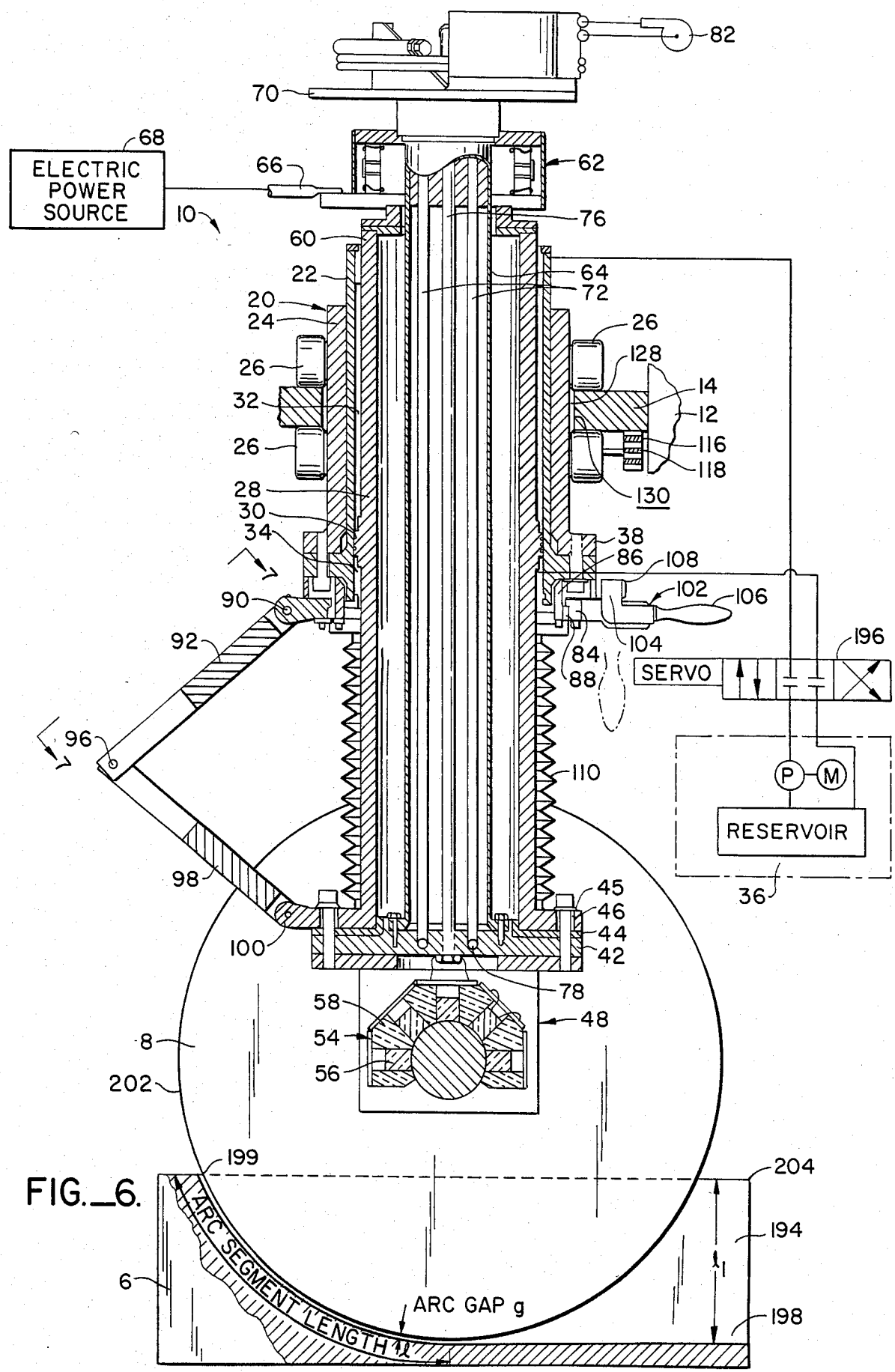
FIG._6.

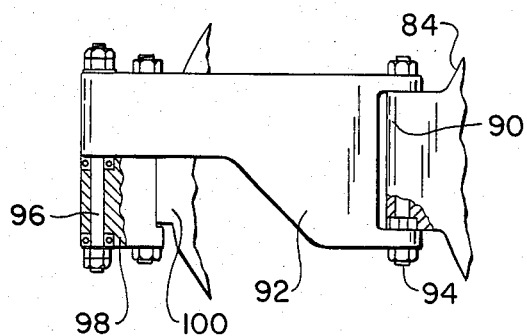
FIG._7.
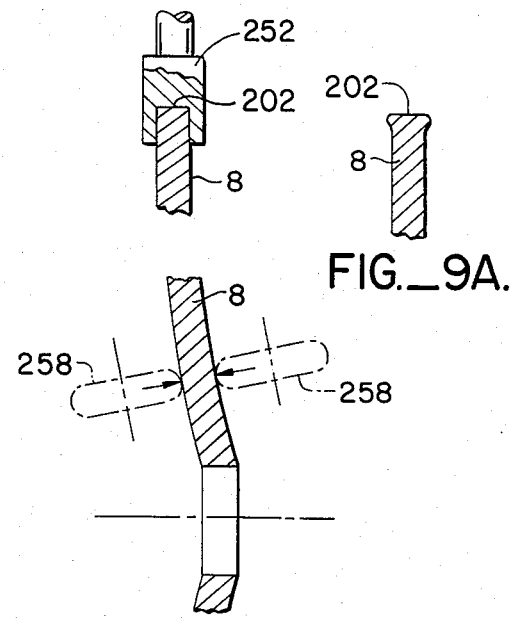
FIG._9A.
FIG._9.
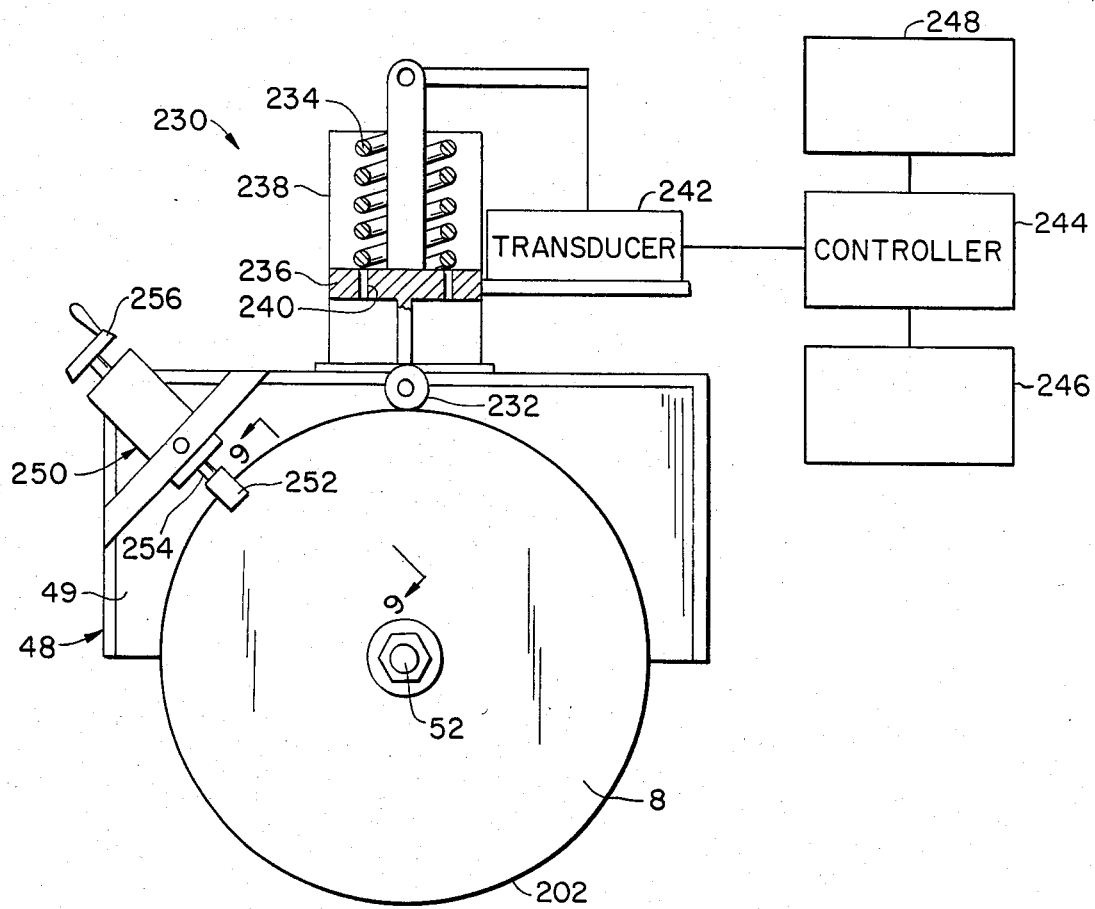
FIG._8.

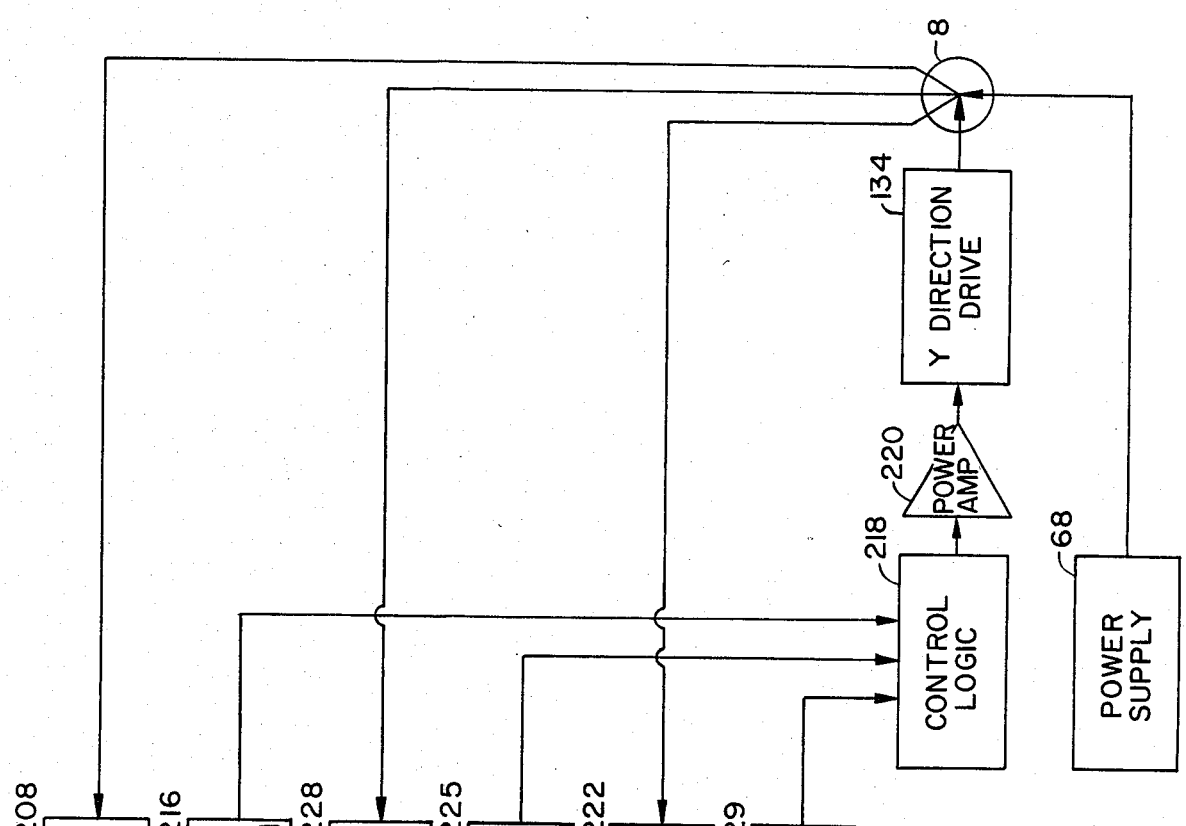
FIG._10.
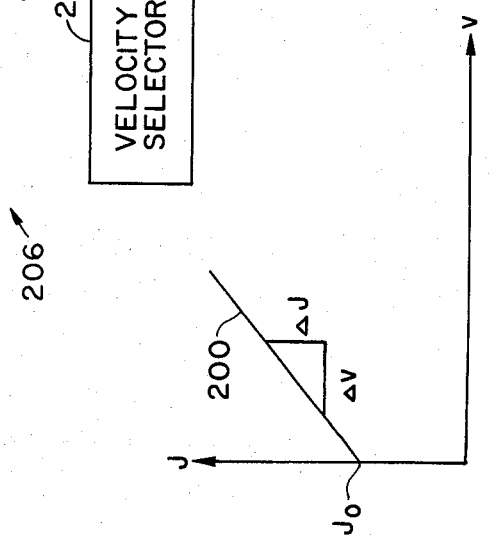
FIG._11.

HIGH SPEED ELECTRIC ARC SAW AND METHOD OF OPERATING SAME

BACKGROUND OF THE INVENTION

The sawing of large metal objects or workpieces such as ingots, heavy plates and the like must be routinely and frequently performed in large scale industrial operations. Although the operation normally requires no more than the slitting of the workpiece, the actual cutting task is laborious, slow and time-consuming, and consumes cutting tools, normally saw blades, at a rapid rate. Consequently, the task is relative expensive.

In the past, best cutting performance was obtained with abrasive saws. Such saws employ abrasive, e.g. hard-faced, diamond-studded, etc. saw blades or discs which are advanced into the workpiece to cut a kerf therein. With increasing workpiece size, and they can have cross-sectional dimensions of up to 65 cm and more, the construction of the saw blade and of the actual saw becomes more and more complicated and expensive. Yet, maximum cutting rates for such saws presently do not exceed about 775 cm$^2$/min. of the workpiece cross-section when it is constructed of steel and about 2 to 2½ times that rate when it is constructed of an aluminous material. At such cutting rates, the abrasive discs are subjected to extreme stresses, are rapidly worn down and represent a constant danger to persons and property in the vicinity of the saw because of possible blade ruptures caused by the high rpm at which such blades must be operated.

It is also known to flame-cut oxidizable materials, primarily steel, with acetylene-oxygen burners. This process is very slow, wastes a great deal of metal, and is not suitable for making deep cuts because there is no good control over the location and orientation of the cutting flame. Because of the stated drawbacks of this system it is usually limited for cutting plate, bars and the like which have a thickness no more and preferably less than about 10 cm.

It has also been proposed to employ so-called arc saws to cut metallic workpieces. According to this approach, a cut is formed by electrically melting a kerf into the workpiece, normally by providing a rotating blade and applying an electric potential between the blade and the workpiece. The blade is then moved towards the workpiece until it makes contact to initiate an electric current flow. The current flow melts the material which is removed from the kerf by the rotating blade.

Although this last mentioned approach appears promising on its face, it has not found acceptance; in fact, it is doubtful that it has ever been employed in a commercial application. The apparent failure of electric arc sawing probably results from the fact that arc sawing as such has never been understood. A review of the relevant prior art indicates an overall concensus that in order to arc saw, one requires no more than a suitable, normally round saw blade and a "suitable" electric power source which applies a potential between the object to be cut and the blade and which generates a "relatively high" current. U.S. Pat. Nos. 1,701,919; 2,015,415; 2,059,236; 2,355,838; and Re. 20,035 are exemplary of the present state of the prior art as known to the inventors.

In all instances, the prior art patents are primarily concerned with the construction of the hardware for an arc saw, to wit the manner in which the saw is mounted, driven and advanced relative to the workpiece; the location of spindles, handles and switches; and the actual configuration of the saw blades, it having been thought that the blade should have conventional saw teeth or variously oriented, shaped and sized serrations to enhance the sawing process. The prior art is conspicuously silent as to the actual operation of the saw, the voltage and current requirements, the quality of the kerf that is cut into the workpiece and the like. These latter aspects, however, primarily determine whether or not a cut can be made at all and if so, whether or not it has the desired quality; and whether the saw, and especially the saw blade is capable of withstanding the intended use. In regard to these aspects the prior art provides no clue whatsoever. As a result, one intending to build an arc saw in accordance with the prior art is faced with developing his own power supply, being told no more than that it should yield a "relatively high current" though it is apparent in its face that a high current for one application may be an insufficient current for another application.

The inventors of the present invention, during actual experimentations as well as during theoretical considerations of the needs of arc sawing quickly determined that arc saws constructed in accordance with the prior art simply were not operable. To be more precise, the prior art fails to teach or suggest how an arc saw can be efficiently and effectively built and operated. Problems encountered with arc saws constructed along the lines suggested in the prior art included an inability to sustain the cutting action of the saw; erratic and highly uneven and, therefore, low quality cuts; rapid wear and tear of the saw blades; unexpected and unexplainable current variations and surges during cutting; difficulties in controlling such cutting parameters as the cutting voltage, current and speed, the observation of a relative non-responsiveness of the cutting operation to changes in the applied voltage; and the like.

In addition to problems relating to the cutting per se, prior art arc saws were for most applications environmentally simply unacceptable. Unless the cutting is performed in a totally isolated atmosphere, the electric arcing that takes place during the arc sawing operation is so noisy that it is beyond human tolerance and would, for example fail to meet present day industrial health and safety regulations. Additionally, prior art arc sawing methods develop great amounts of dust and flying debris, cause sight impairing electric sparks, and generate such a high degree of ultraviolet radiation as to require special shielding to prevent operating personnel from suffering skin burns.

It is, of course, not possible to speculate and isolate the one or more exact reasons which prevented arc sawing from becoming a commercially feasible cutting method. It is reasonable to assume, however, that the many drawbacks discussed above combined with the lack of control that could be exercised over the cutting operation and the generally low quality cuts that were made combined to spell the demise of arc sawing on a commercial scale.

SUMMARY OF THE INVENTION

The present invention resulted from the inventors' success in isolating important parameters that determine the performance of an arc saw and in applying these parameters to the operation and construction of the saw. As a result of the present invention, it is now possible to efficiently and economically make cuts through even the largest workpieces, such as steel ingots of sizes of up to 65 cm in diameter and larger. The cuts are made at a very high speed and exhibit excellent surface finishes, of a quality competitive with other prior art cutting or sawing methods. All this is accomplished while the cutting operation is performed with virtually no atmospheric dust, debris or light contamination and at a sound level equal to that resulting from a relatively low volume rushing water flow.

A main aspect of the present invention relates to the actual operation of the saw. In order to perform any sawing or cutting at all it is necessary that a minimum or a threshold current is present, that current is virtually unaffected by the applied voltage and can be expressed in terms of the threshold current density $J_o$ where $$J_o = a \cdot 10^6 \text{ amperes per square meter (amps/m}^2\text{)} \quad (1)$$

wherein "a" is in the range of between about 2 and about 16.

For any given cut the threshold current density translates into a minimum or a threshold current $I_o$ wherein $$I_o = a \cdot s \cdot 10^6 \text{ amps wherein} \quad (2)$$

s = w·l in m² and is the effective surface area of the kerf or cut;
w = the width of the kerf in m; and
l = the arc segment length in m, that is the length of the blade periphery over which arcing occurs.

The formulas for $I_o$ and $J_o$ were empirically determined by the inventors on the basis of more than 600 test runs in which the current, voltage and the actual cutting, that is the actual melting of metal in the workpiece were carefully monitored. Up to the present, the inventors have been unable to fully isolate the parameters which determine the precise value of "a". It is believed, however, that "a" is relatively unaffected by the material being cut (the inventors' test were performed on such diverse metals as carbon steel, stainless steel, cobalt-base high temperature alloys, nickel-base alloys, soft steel, tool steel, cast iron, aluminum, copper, zirconium and titanium) but it apparently is partially affected by the saw blade cross-section at its periphery, e.g. rectangular or triangular; the temperature of the environment in which the cut is made; and the actual temperature of the workpiece. The last parameter possibly has the greatest influence on the value of "a".

Although the stated range for "a" appears to cover all normally encountered circumstances, it is conceivable that the range may be exceeded under particular operating conditions. Moreover, on a statistical basis the inventors were able to determine that for operation of the saw at room temperature (environment as well as workpiece temperature) "a" has a value of approximately 5 for the cutting of steel, copper and aluminum. From this the inventors deduce that in the stated range for "a" of 2 to 16 most extreme operating conditions are probably included.

In actual operation, the application of the threshold current leads to a relatively low cutting speed. The inventors speculate that this is due to the fact that the major proportion of the energy transmitted to the workpiece by the threshold current is dissipated into the workpiece and results in a heating thereof. Consequently, a relatively low proportion of the energy is employed for the actual melting of workpiece metal. Therefore, in order to increase the cutting speed to the desired level it is necessary to apply a cutting current I (in amps) which exceeds the threshold current $I_o$ by a factor of at least about 1.5 and preferably by a larger factor that normally falls into the range of between about 2 to about 40. Limits on the increase of the cutting current over the threshold current are the limits of the power supply and the maximum current the workpiece and/or the blade (hereinafter usually referred to as "workpiece") can conduct without an undue heat buildup.

Cutting currents in the range of from about 500 amps to about 15,000 amps have yielded excellent results when cutting workpieces made of steel, aluminum, copper, etc. and having thicknesses of from about 1 mm to about 200 mm. It is contemplated, however, to employ cutting currents of as much as 30,000 amps or more for cutting or slitting large cross-section workpieces such as 50–75 cm ingots and the like at very high cutting speeds.

Within the outlined cutting current consideration and limitations, it is, of course, desirable to employ the highest possible current so that a given cut can be completed in the shortest possible time. A subjective, on-the-spot determination of the maximum current is not feasible because even if one observes that the power supply has excess capacity, simply increasing the cutting speed to thereby correspondingly increase the cutting current will eventually outstrip the available current. At that point, the periphery of the blade will contact the kerf bottom and will short out the power supply, thereby requiring its immediate shutdown. Further, any physical contact between the blade and the workpiece damages both the workpiece and the saw blade and may require the replacement of either one or both of them, a result that should clearly be avoided under all circumstances.

In order to nevertheless maximize the cutting speed for a given workpiece and power supply, the present invention provides a method for determining the maximum possible cutting speed v where $$v = \frac{J - J_o}{M} \text{ in m/sec wherein} \quad (3)$$

$$J = \frac{I}{s} \text{ in amps;} \quad (4a)$$

$$M = \frac{\Delta J}{\Delta v} \text{ in amp-sec/m}^3 \quad (4b)$$

J = cutting current density in amps/m²
I = the cutting current in amps
$\Delta v$ = the incremental change (in m/sec) in the speed v;
$\Delta J$ = the incremental change (in amps/m²) in the current density which results from $\Delta v$; and
s = w·l as above defined.

$\Delta J/\Delta v$ is conveniently determined by measuring the cutting current density at different cutting speeds. It has been found that there is a substantially linear relationship between the two with the threshold current density being equal to a cutting speed approaching zero. $\Delta J/\Delta v$ than is the slope M of the resulting curve with M being further $$M = \frac{\Delta H_m}{E_{eff.}} \text{ in (amp} - \text{sec/m}^3\text{) wherein} \quad (5)$$

$\Delta H_m$ = enthalpy difference of the workpiece material between the actual workpiece temperature and the temperature at which the workpiece material is removed (joules/meter$^3$), and $E_{eff}$ an empirical effective voltage, most conveniently referred to as the theoretical proportion of the applied voltage that goes into the melting of workpiece material as contrasted with the remaining proportion of the voltage that can be considered as going into heating of the workpiece material surrounding the cut and other losses. For most cutting conditions $E_{eff}$ is about 7 volts for cutting voltages in the range of between about 15–45 volts.

Using the above formula (3) it is possible to calculate the cutting parameters required for a wide range of materials, sizes, and conditions since the values of enthalpy of materials is available in tabulated form for most materials which would normally be cut. For example, by substituting I/s for J and for a given M one can readily determine the actual cutting speed $v = [I/s - J_o]1/M$ for a predetermined cutting current I, a known $J_o$ and M, and the known effective kerf surface area s.

Thus, the present invention enables one to select the highest possible cutting speed for a given cutting current within the capacity of the power supply and/or the current take-up limitations of the workpiece. When the cutting speed is selected as above set forth, a high quality cut can be made in the shortest possible time.

Since there exists a close relationship between the quality of the cut, the cutting speed, and the cutting current, it is apparent that a change in either one may adversely affect the sawing operation. Accordingly, the present invention also provides that these parameters are continuously monitored and adjusted to keep them in balance. Normally, this means that the cutting speed is continuously varied so that the saw operates at a preselected, substantially constant cutting current although operation of the saw at a preselected, constant cutting speed or voltage can be employed if it should prove advantageous for a particular application.

To control these cutting parameters the present invention contemplates to employ a well-regulated, rapidly responding power supply for the saw, which is preferably a constant voltage but which may be a constant current supply that provides the lowest feasible voltage commensurate with a high quality cutting action. The voltage selection is made so that there exists a relatively small arcing gap "g" between the periphery of the saw blade and the bottom of the kerf in order to assure a substantially homogenous arcing over the arc segment length to assure a high quality cut having a good surface finish.

Since the arcing gap is almost solely a function of the applied voltage, while the rate of metal removal is almost solely a function of the current flow between the blade and the workpiece, the arcing gap must be sufficiently large to accommodate the constantly occurring changes in the metal removal rate and the corresponding changes in the saw blade feed or advancing speed without either increasing the arcing gap so much as to interrupt the current flow or cause electrical shorts from physical contact between the blade periphery and the kerf bottom.

In accordance with the present invention the arcing gap is preferably in the order of a few tenths of a mm, normally in the range of between about 0.2 to about 0.4 mm, with a resulting voltage between the blade and the workpiece in the range of between about 15 to 45 volts.

A decrease in the voltage below 15 volts makes it most difficult to adequately control the blade advancing speed because the arcing gap becomes too small. An increase of the voltage above about 45 volts, though entirely operative, compromises the surface quality of the cut due to an increase of the arcing gap, and a resulting non-uniform arcing over the arc segment length which causes localized current surges and leads to the formation of cutting surface irregularities, gouges, streaking and the like.

Although the arc sawing method of the present invention can be employed in any environment, except for special applications, such as the cutting of radioactively contaminated materials which must be performed in an enclosed, shielded environment, the workpiece is preferably arc sawed while submerged in water. When the workpiece is sawed in a gaseous atmosphere, e.g. in air, a liquid coolant spray such as water is preferably applied to prevent the blade from overheating. To facilitate the ease and speed with which the workpiece can be submerged in water during the cutting operation, the present invention provides a fluid, e.g. air pressure actuated water table which has a workpiece mounting surface disposed on top of an airtight air-water tank. One or more riser tubes communicate the upper workpiece mounting surface of the table with a lower portion of the tank that is normally filled with water. After the workpiece has been mounted air can be injected into the upper tank portion thereby forcing the water through the riser tubes over the workpiece. As soon as the cut is completed the pressurized air is vented from the tank top so that the water recedes rapidly through the riser tubes to the tank bottom. Means are further provided in the water table to periodically cleanse it of metal particles and other debris that accumulate during the cutting operation. Arc sawing a workpiece while submerged in water eliminates the above-discussed environmental hazards. In particular, the intolerable noise generated by high current arcing in an air environment is totally eliminated. Instead, the only audible noise is that generated by the rushing of water drawn into the kerf by the rotating saw blade. Moreover, all metal particles and other debris that is generated during the sawing operation is and remains entrapped in the water and does not become airborne. Further, the sight impairing and skin irritating and/or burning radiation generated during the cutting process is reduced to such an extent that an operator can remain in the vicinity of the saw without protective garments. Thus, this aspect of the present invention renders arc sawing feasible while complying with today's strict environmental and safety precautions and regulations.

In addition, the underwater, e.g. submerged arc sawing of the present invention further facilitates the removal from the kerf of molten metal and debris since the continuous water stream carries such debris with it. The likelihood of blockage of the kerf by previously removed material and the possibility of a resulting fusion of molten metal particles to the side walls of the kerf, which would effectively counteract the cutting operation, is thereby prevented since molten metal particles are substantially instantaneously cooled and hardened and, therefore, cannot fuse with the kerf walls.

The efficiency and effectiveness of the arc sawing method of the present invention is demonstrated by its high cutting rate. For example, while operating at a voltage of about 25 volts and with a cutting current of I = 13,000 amps cutting rates of approximtely 1,800

$cm^2$/min. of workpiece cross-section have been attained while cutting ferrous materials, e.g. carbon steel, while cutting speeds of as high as about 5,000 $cm^2$/min. have been achieved when cutting aluminous materials (meaning metals comprising primarily aluminum). The inventors expect that these cutting rates can be increased by a factor of 2 or more with electric power sources of suitable sizes which, during the testing stage of the present invention, were not available to them and provided, of course, that the workpiece itself can handle such high current without overheating, localized melting or the like.

At least in part, this high cutting rate is made possible through the use of saw blades that are relatively thin, preferably in the range of between about 1.5 mm to about 6.5 mm. Such thin blades are feasible when the blade is as homogenous as possible and free of peripheral teeth and/or serrations and further when the blade is rotated at a sufficiently high rate of rotation (in the vicinity of about 40 m/sec. of linear blade periphery speed) so that the blade periphery neither undulates nor overheats. In order to keep the blade truly planar during such high speed operation, it is preferably pre-tensioned by constructing the blade so that its center is dished-in while at rest. At increasing rotational speed, the periphery of the blade elongates more than the center so that the blade "straightens out" and assumes a flat, planar configuration devoid of peripheral undulations as are frequently experienced with blades that are flat when at rest.

In the past blades, particularly abrasive blades had to have a substantially greater thickness to enable sufficient strength and to enable accommodating peripheral teeth and/or serrations. This in turn increases the width of the kerf that is the cut, increases energy requirements, and reduces the cutting speed all of which renders the cutting operation more expensive.

At today's high metal prices, the reduced kerf width made possible by virtue of the present invention can result in significant material savings. For example, certain high grade metals such as cobalt and nickel base alloys presently sell for as much as $15.00 per kg. or more. When cutting a 61 cm (24 inch) diameter billet, for example, prior art sawing methods required a minimum kerf width of at least about 10 mm. In contrast thereto, such a billet can be arc sawed in accordance with the present invention with a 1 m diameter blade of a thickness of as little as about 2.5 mm (for underwater cutting) resulting in material savings of approximately 15 kg. per cut. This translates into monetary savings for a single such cut of around $250.00. Added thereto, must be cost reductions resulting from the high cutting speed and from the lesser energy consumption for such a thin cut because so much less metal must be removed, i.e., molten during the cutting operation.

Although the arc saw of the present invention has significant advantages in the cutting of a variety of heavy metal sections, it also has some inherent advantages over abrasive saws and cold saws in the cutting of more delicate structures and of angle or mitre cuts in difficult-to-cut materials. Angle and mitre cuts at extreme angles are almost impossible to perform with hard materials and conventional sawing equipment. With the arc saw of the present invention such cuts are readily accomplished because no physical contact between blade and workpiece is required. Therefore, side pressure and snaking of the saw are not encountered.

For the same reason, it is possible to cut through a variety of cross-sections both thin or thick without crushing or tearing thin sections. Very thin metal structures can be accurately cut without damage due to the absence of heavy cutting pressures on the workpiece.

It has also been evidenced in the cutting apart of heat exchangers (such as found in nuclear power plants) and other difficult cross-sections that loose tubes and similar objects will not bind the saw because the arc melts away any binding action caused by a shifting of the workpiece or of components thereof. To date the inventors have encountered several applications (such as bundles of very thin metal tubes) in cutting that can only be successfully accomplished with the arc saw of the invention.

In terms of the actual sawing apparatus, the present invention generally provides, in addition to the already discussed electrically conductive saw blades and the power source, means for rotating the blade about its axis and feeding means for advancing the blade towards and past the workpiece while the power source causes a current flow between them. Means are further provided for monitoring the current flow between the blade and the workpiece. Control means are operatively coupled with the monitoring means and the feeding means for varying the blade advancing speed as a function of the monitored current flow so as to maintain the current flow substantially constant while the kerf is being cut.

The control means preferably include means for setting a desired current flow magnitude for cutting the kerf in question which, broadly speaking, includes comparator means operatively coupled with the adjutment means and the monitoring means for generating a comparator signal responsive to the difference between the instantaneous current flow sensed by the monitoring means and the current flow magnitude set by the adjustment means. Means that are responsive to the comparator signal generates speed control signals which are applied to the feeding means to change the blade advancing speed until the set current flow magnitude substantially corresponds to the instantaneous current flow.

The saw blade is mounted to a support structure which preferably provides multi-directional saw blade movements, e.g. in mutually perpendicular X, Y and Z directions, so that vertical cuts for relatively small workpieces as well as cross-cuts and longitudinal or rip cuts can be made. To accommodate such multi-directional cutting the saw blade is rotatable about a vertical axis through an arc of at least 90° by mounting the blade to one end of an an elongate, tubular, vertically oriented piston that is reciprocably received in a tubular cylinder defining first and second pressure applying chambers. Indexing means are provided to operatively connect the cylinder and the piston for rotatably moving the piston between at least two operative saw blade positions, spaced-apart by an arc of 90° and for locking the piston in the respective operative saw positions. The indexing means are preferably constructed in the form of a knee-joint (sometimes also referred to as a "nutcracker" connection) which translates the rotational movements of the indexing means to the piston while permitting reciprocating piston movements.

In addition to accommodating the necessary pivotal saw blade movements, the provision of a hollow piston makes it possible to conveniently and efficiently guide hydraulic and electric power lines to the saw blade and to its associated drive motor.

It is apparent that the reciprocating, vertically oriented saw blade mounting piston provides the desired saw blade movement in the vertical or Z axis. To move the blade in the X and Y axes the cylinder is preferably mounted to and is linearly movable along a cross-head that spans over the workpiece being cut and that in turn is mounted to laterally spaced carriages movable along a rail that is perpendicular to the cross-head. Suitable drive means for moving the cylinder along the cross-head (in the X-direction) and the carriages in the Y-direction may include double acting hydraulic cylinders for relatively short travel lengths or rack and pinion drives for greater travel lengths. Since the latter drive always includes some play, which is intolerable in view of the small arcing gap employed during the sawing operation, a rack and pinion drive is preferably coupled with an anti-backlash drive which counteracts the rack and pinion drive but which exerts a lesser force so that the latter overrides the former while all backlash or play is eliminated. Precise speed and position controls, which are necessary for accurately maintaining the cutting current flow, arcing gap and blade advancing speed relationships are thereby possible.

BRIEF DESCRIPTION OF THE DRAWINGS

FIG. 1 is a plan view which schematically illustrates the overall construction of an electric arc saw constructed in accordance with the present invention;

FIG. 2 is a fragmentary plan view of a workpiece holding table constructed in accordance with the present invention for temporarily submerging the workpiece in water during the arc cutting operation;

FIG. 3 is a side elevational view, with parts broken away and with parts in section, illustrating the construction of the table of FIG. 2 in greater detail;

FIG. 4 is a front elevational view, in section of the table shown in FIG. 2;

FIG. 5 is a fragmentary front elevational view of an electric arc saw mounting head constructed in accordance with the present invention and permitting pivotal blade movements about and reciprocating blade movements along a vertical axis;

FIG. 6 is a fragmentary side elevational view in section and is taken along lines 6—6 of FIG. 5;

FIG. 7 is a fragmentary view, partially in section, taken in the direction of line 7—7 of FIG. 6;

FIG. 8 is a schematic, side elevational view illustrating an electric arc saw fitted with a peripheral blade edge dressing tool and with a peripheral blade wear compensator constructed in accordance with the present invention;

FIG. 9 is a fragmentary sectional view taken on line 9—9 of FIG. 8 and schematically illustrates the functioning of the blade edge dressing tool and of the dished-in, pretensioned configuration of the blade when at rest;

FIG. 9a is a view similar to FIG. 9 but illustrates the gradual deformation of the blade periphery if used for extended time periods without being "dressed";

FIG. 10 is a schematic block diagram of the blade cutting speed-cutting current-feedback control; and FIG. 11 is a diagram showing the relationship between cutting current density and cutting speed.

DESCRIPTION OF THE PREFERRED EMBODIMENTS

Referring initially to FIG. 1, an arc saw 2 constructed in accordance with the present invention generally comprises a mounting table 4 for a workpiece 6 to be cut or slitted with a rotating saw blade 8 of the saw. The saw blade is mounted to a vertically reciprocating hydraulic actuator 10 (vertical actuator) for raising and lowering the blade in the Z-direction. The actuator also permits pivotal movements of the saw blade about the vertical Z axis from the position shown in FIG. 1 to one offset by 90° relative thereto.

The vertical actuator 10 is linearly reciprocably carried by a bridge or cross-head 12 which includes guide rails 14 and an X-direction drive 16 for reciprocating the vertical actuator in the X-direction. The bridge is disposed over mounting table 4, is carried by a pair of spaced-apart carriages 132, and is movable perpendicular to the guide rails 14 in the Y direction along a pair of tracks 18 which straddle the mounting table. In operation an electric power source (not shown in FIG. 1) applies an electric potential or voltage between workpiece 6 and saw blade 8. The blade is rotated and advanced into the workpiece whereby an electric current flows between the two which melts a narrow kerf into the workpiece and thereby cuts or slits as is more fully described hereinafter.

Referring now to FIGS. 1 and 5-7, the vertical actuator 10 that mounts the saw blade comprises a tubular, open-ended cylinder 20 defined by a cylinder sleeve 22 disposed between and surrounded by a tubular yoke 24 which carries two sets of rollers 26 that engage and support the yoke on guide rails 14 of bridge 12. An elongated, cylindrical and tubular piston 28 is reciprocably disposed within sleeve 22 and has a length at least about twice the length of the sleeve. At its axial center the piston includes an annular projection 30 which is sealed to the interior cylindrical sleeve wall to define upper and lower pressure chambers 32 and 34. A source 36 of pressurized liquid is operatively coupled with the pressure chambers via a suitable valve 196 and the upper and lower ends of the sleeve are sealed with respect to piston 28 so that the pressurization of the upper or the lower chamber causes a corresponding movement of the piston in a downward or an upward direction, respectively. It should also be noted that the hydraulic piston is free to rotate about its vertical axis relative to sleeve 22, the latter being fixed, e.g. bolted to an end flange 38 of yoke 24.

A lower end of piston 28 is defined by an end flange 40 to which is mounted a flange plate 42. The flange plate is insulated from the piston by insulation layers 44, washer 45, and insulating sleeve 46. A saw blade drive unit is attached to the underside of the flange plate and preferably includes a hydraulic motor 50 coupled with saw blade 8 via a horizontal shaft 52. A slip ring assembly 54 provides an electric connection capable of carrying the high cutting current between flange plate 42 and shaft 52. The slip ring assembly includes a plurality, e.g. four brushes 56 which are conventionally biased into engagement with the rotating shaft and which are carried in an otherwise conventional brush-holder 58 that is electrically coupled (not separately shown on the drawings) to the flange plate.

The upper end 60 of the piston carries an upper slip ring assembly 62 which electrically couples a tubular busbar 64 disposed interiorly of the hollow piston with a conductor 66 coupled to an electric power source 68. Carried on top of the tubular busbar is a connector plate 70 which couples the hydraulic lines, collectively identified with the reference numeral 72, with a like plurality of vertical hydraulic supply tubes 74 disposed interiorly of busbar 64 and piston 28. A tie-rod 76 secures the upper connector plate 70 to the upper piston end 60 and the lower piston flange plate 42.

The lower ends of the hydraulic supply tube 74 are fluidly connected through internal conduits 78 in flange plate 42 with a hydraulic motor feed line 80 and a return line (not shown in the drawings) so that pressurized hydraulic liquid from a hydraulic pump 82 can drive motor 50 to rotate blade 8.

A ring 84 is rotatably mounted with roller bearings 88 to a tubular cylinder stub 86 which projects downwardly from sleeve 22 and yoke 24. One side of the ring includes a radial projection 90 to which one end of an upper arm 92 is pivotally attached with a pivot bolt 94. The other end of the arm is pivotally connected with a pivot pin 96 to one end of a second, lower arm 98. The other end of the lower arm is in turn pivotally connected to a boss 100 that projects radially outward of lower piston end flange 40.

An indexing and locking lever 102 is also mounted to ring 84, preferably opposite the radial ring projection 90. The lever has a generally L-shaped configuration and is positioned so that one of its legs 104 extends upwardly when handle 106 is in a horizontal position. Stop block sets 108 project radially outward from cylinder stub 86 and they are dimensioned and located so that lever leg 104 can engage them and thereby lock the ring in desired operating orientations of the saw blade 8. For most purposes the provision of two stop block sets 108 spaced apart 90° and located so that the saw blade can be aligned with the X and the Y axes are sufficient.

The release of the locking lever by pivoting the handle in a clockwise direction (as seen in FIG. 6) enables the operator to rotate ring 84 with respect to sleeve 22 and yoke 24. This ring rotation is transmitted to piston 28 via pivot arms 92, 98 so that the proper and precise indexing of the ring results in a simultaneous proper and precise indexing of the piston and of saw blade 8. To prevent undesirable play or relative deflections, the pivot arms and their pivotal connections are relatively wide, as is best illustrated in FIG. 7, so that they are rigid in the direction of rotation of the ring to assure a precise duplication of the ring rotation by the blade. It will be observed that the knee-joint type connection provided by pivot arms 92, 98 accommodates reciprocating piston movements while providing the desired saw blade indexing and locking.

To protect the outer surface of piston 28 from contamination, which in time can compromise the seal between it and sleeve 22, a bellows sleeve 110 is provided. The ends of the bellows are attached to the lower piston end flange 40 and to ring 84.

To operate the vertical actuator to raise or lower saw blade 8, pressurized hydraulic liquid from source 36 is introduced into the lower or the upper pressure chamber 34, 32, respectively, so that piston 28 moves in the vertical (Z) direction until it is at the desired elevation. In this connection, it should be noted that suitable valving such as a servo valve (collectively identified with reference No. 196) pressure source 36 and the pressure chambers can be provided to effect a relatively rapid raising or lowering of the saw blade to put it into a desired position or, alternatively, to advance the blade in the Z direction at a precisely controlled rate to make a vertical cut through the workpiece 6.

In addition, the saw blade can be rotated about the Z axis between first and second operating positions in which the blade is parallel to the X axis or the Y axis, respectively, by disengaging locking lever 102 from one of the stop block sets 108 and rotating ring 84, arms 92 and 98, and therewith piston 28. When the blade is in the desired second operating position locking lever 102 is pivoted in a counterclockwise direction (as seen in FIG. 6) to engage the other stop block sets 108. If desired for a particular application, additional stop block sets (not shown in the drawings) may, of course, be provided to index the blade in intermediate angular positions, such as at 30°, 45°, etc. relative to the above-mentioned first and second operating positions.

X direction movements of hydraulic actuator 10 and therewith of saw blade 8 are accomplished by moving rollers 26 attached to yoke 24 along guide rails 14 mounted to bridge 12. For short travel lengths, in the order of about 150 cm, a hydraulic drive 112 may be provided. Such a hydraulic drive has the advantage that it can be precisely controlled and that it is backlash-free. For a greater travel length, a rack and pinion drive 114 is preferred.

In one embodiment of the invention, a gear rack 116 is attached to the underside of guide rail 14 and is engaged by a spur gear 118 mounted to yoke 24 and driven by a motor 120. Since rack and pinion drives necessarily have some play, even if it is only the order of a few tenths of a mm, and since for purposes of the present invention such a play is highly undesirable if not unacceptable because of the very small arc gap (also in the order of only a few tenths of an mm) the present invention provides an anti-backlash drive 122 which eliminates the play experienced with rack and pinion drive 114.

The anti-backlash drive is defined by a second spur gear 124 which is driven by an air or hydraulic motor 126 in a fixed direction. The drive force exerted by the anti-backlash motor is less than that exerted by the drive motor 120 so that the latter overrides the former. However, the force generated by anti-backlash motor 126 eliminates the earlier discussed play inherent in rack and pinion drives and thus enables the precise control of the position of the drive, and therewith of the vertical actuator 10 at all times. Accordingly, the provision of the anti-backlash drive 122 enables one to control and maintain the small arcing gap that exists between the blade periphery and the kerf bottom as is more fully discussed below.

When guide rails 14 are flat as is illustrated in FIGS. 5 and 6 and rollers 26 are cylindrical, pressure pads 128 are provided which may comprise cylindrical discs that are spring or otherwise biased toward and into sliding engagement with faces 120 of the guide rails. In this manner, lateral movements (generally the Y-direction) of yoke 24 are prevented. Alternatively, the pressure pads can be replaced with suitably mounted idler wheels (not shown) or the yoke support rollers 26 can be peripherally grooved to engage guide rails which have corresponding wheel groove engaging and centering protrusions (not shown).

The ends of bridge 12 are supported by carriages 132 fitted with wheels (not separately shown) that support the bridge and vertical actuator 10 on and that ride in the Y direction along tracks 18. The tracks may be of any suitable construction, such as a triangular or circular track engaged by correspondingly grooved wheels to guide the carriages in the Y-direction and to prevent lateral play thereof in the X-direction. The tracks are carried by suitable track supports 140 which straddle mounting table 4. The carriages are further fitted with a Y-direction rack and pinion drive 134 that includes a linear gear rack 136 and a cooperating spur gear 138 driven by a hydraulic or electrical motor (not separately shown). The Y-direction drive is also fitted with an anti-backlash drive (not separately shown) constructed, operating and coacting with the rack and pinion drive 134 in the same manner in which rack and pinion drive 114 coacts with anti-backlash drive 132 described above.

It will now be apparent that the arc saw 2 enables the controlled movement of saw blade 8 in the X, Y and Z axes to make vertical and cross-cuts as well as longitudinal rip cuts (in the Y-direction). The saw further provides means for rotating and indexing the saw blade in first and second operating positions, spaced-apart by 90°, for aligning the blade with the X axis when cutting in the X-direction, with the Y axis when cutting in the Y-direction, and with either the X or the Y axis when making vertical cuts.

The mounting table 4 underlies bridge 12 and receives and supports workpiece 6 while it is being cut. It also submerges the whole workpiece, or at least those portions of the workpiece in which a kerf is being cut, under water. In order to save time, it is important that the mounting and removal of the workpiece can be performed as quickly as possible. To avoid the need for underwater mounting, which is time-consuming and diffcult to perform, and to conserve water and avoid its unnecessary waste, mounting table 4 of the present invention is constructed so that the whole workpiece can be quickly submerged in a body of water and so that the water can be rapidly removed after completion of the cut while the water can be recycled.

Referring now to FIGS. 1-4, mounting table 4 is defined by a horizontal mounting plate 142 that has sufficient strength to support the largest workpiece 6 contemplated to be cut by the saw. The mounting plate includes a plurality of mounting holes 144 that may receive clamps or the like (not separately shown) and which are sealed (air and watertight) from the underside 146 of the plate by blocks 148 welded to the underside in an airtight fashion.

Disposed beneath the mounting plate is an air-water tank 150 which is sealed to the mounting plate with suitable welds. At least one and preferably a plurality of riser tubes 152 have an upper end 154 sealed to corresponding apertures 156 in the mounting plate and a lower end 158 suitably supported by tank bottom 160 and communicating with a lower tank portion 162 via cutouts 164 in the riser tubes.

In the preferred embodiment of the invention, the lower riser tube ends are supported by tank mounting bosses 166 which extend to below tank bottom 160 and which support the tank on a suitable support bases (not shown). The tank bottom is preferably defined by sloped bottom plates 168 so that debris that may accumulate within the tank collects at the lowermost point of the tank. Cleanout flanges 170 are positioned at the lowermost point of the tank, can be closed with suitable flange plates (not separately shown) and enable the removal from the tank of debris that may collect therein.

An air inlet and exhaust port 172 communicates an upper portion 174 of the tank with a pressurized air source 176 via an inlet valve 178. An exhaust valve 180 is also in fluid communication with port 172 and communicates it with the exterior of the tank.

In use the workpiece is first mounted, e.g. clamped to the mounting plate 142 and the water tank 150 is substantially but preferably not completely filled with water. To submerge the workpiece under water, inlet valve 178 is opened to force pressurized air into the upper tank portion 174 which in turn forces water through riser tube cutouts 164 to above mounting plate 142. Vertical retaining walls 182 extend above the mounting plate and prevent water spillage. After the workpiece has been fully submerged inlet valve 178 is closed and the water level remains above the mounting plate and the workpiece as is indicated in phantom lines in FIG. 3.

After completion of the saw cut, exhaust valve 180 is opened. The static water head forces the air from the upper tank portion 174 to the exterior of the tank and all water rushes from above the mounting plate back into the air-water tank 150. Thereafter the exhaust valve is closed, the workpiece is removed from the mounting plate and ready to receive a new workpiece. It will be observed that the present invention enables the almost instantaneous submerging of the workpiece in water, the almost instantaneous removal of the water after completion of the cut and a continuous recycling of the water. Moreover, the actual clamping of the workpiece can be performed in air rather than under water. This greatly facilitates the speed with which the workpiece can be mounted and removed, renders the mounting operation less objectionable, and saves water, an increasingly scarce commodity.

During arc sawing a significant amount of debris, primarily small, solidified molten metal articles accumulate. To facilitate the removal of such debris, mounting plate 142 includes a generally rectangular debris cutout 184 positioned so that the molten and resolidified metal particles removed by the blade during the cutting operation are discharged from the kerf in the direction of the debris cutout. In the arrangement shown in FIGS. 2-4, the cutout is positioned to the right (as seen in FIG. 3) of saw blade 8 as the blade rotates in a counterclockwise direction as seen in FIG. 3. If desired, additional debris cutouts can be provided at suitable places on the mounting plate.

A debris collecting well 186 is located beneath cutout 184 and it includes a downwardly sloping chute plate 188 which terminates in a flanged cleanout opening 190 of a sufficient size to facilitate the quick and relatively frequent removal of accumulating debris. To prevent large objects from falling into the debris well, which may clog it, a screen 192 is placed slightly below mounting plate 142 and extends over the full opening of debris cutout 184.

Referring now to FIGS. 1-10, the operation of arc saw 2 will be discussed in greater detail. Initially workpiece 6 is mounted to plate 142 of table 4 and air inlet valve 178 is opened until the water level on the table is above the workpiece. At that point the valve is closed and saw blade 8 is moved to the desired location at which the cut is to commence. As an example, it is assumed that a rip cut (in the Y-direction) is to be made and that a kerf 194 is to be cut or slitted into the workpiece which does not extend entirely through the workpiece as is illustrated in FIGS. 5 and 6. The saw blade is oriented so that its drive shaft 52 is parallel to the X-direction and the blade itself faces in the Y-direction as is shown in FIG. 6. If necessary, the saw blade is rotated about the Z axis by releasing locking lever 102 and rotating saw blade mounting piston 28 into the desired saw blade position. The lever is then engaged with stop block sets 108 to properly index, i.e. to properly align the blade with the Y-direction.

Valve 196 (FIG. 6) is suitably operated to raise or lower, as the case may be, piston 28 and therewith saw blade 8 until the lowermost point of the saw blade substantially coincides with the desired location of kerf bottom 198.

Next the operator selects the desired cutting current based on the capacity of electric power source 68 and the ability of workpiece 6 to withstand such current without undue heating, melting or the like. Assuming that there are no restrictions in the current capacity of the workpiece (at least within the maximum current output of electric power source 68) and assuming that the cut does not require a lower current due to special surface finish requirements for the cut, the operator will normally set the cutting current at or at a point approaching the maximum current rating of the power source to minimize cutting time.

Having selected the cutting current, the operator next proceeds with setting the cutting speed v in accordance with the above-mentioned equation (5), or $$v = (J - J_o) \cdot \frac{\Delta v}{\Delta J} \text{ m/sec,} \quad (6)$$

which can be further transformed into $$v = \left[ \frac{I}{s} - J_o \right] \frac{\Delta v}{\Delta J} \text{ m/sec} \quad (7)$$

in which I is again the cutting current and s the effective kerf surface area

Referring now momentarily to FIG. 11, $\Delta J/\Delta v$ is preferably tabulated or in graphic form, as is illustrated in FIG. 11, by plotting the cutting current density for a given material from measured values for cutting current I, the kerf depth "$L_l$" and the kerf width "w". Typically, the speed and cutting current density relationship is linear as is illustrated in FIG. 11 with the minimum cutting current density $J_o$ being the earlier discussed threshold current density at which the cutting speed approaches zero. For practical purposes, of course, at $J_o$ the cutting speed is not zero but very slow. $\Delta v$ and $\Delta J$ are defined by the slope of curve 200 and can be directly read off a diagram. M values can be established for various materials tabulated to assist the operator in setting parameters.

The drive unit for advancing the blade in the cutting direction, in the present example the Y-direction rack and pinion drive 134, includes suitable speed controls, such as valves (not separately shown) in the event the drive motor is a hydraulic motor, or electric controls in the event the drive motor is an electric motor, to precisely set the rate at which the drive advances carriages 132, bridge 12 and therewith blade 8 in the cutting (Y) direction.

Having selected the proper drive speed for the cut to be performed, electric power source 68 and blade drive motor 50 are energized, and Y-direction drive 134 is activated to advance the blade towards the workpiece 6 mounted on table 4 and submerged in water. As soon as blade periphery 202 comes in close proximity to the workpiece arcing between the blade periphery and the workpiece commences, thereby melting workpiece material which is removed instantaneously by the rotating blade and the water stream induced thereby. Since initially there is a very high current concentration between the blade periphery and workpiece edge 204, the workpiece material melts rapidly so that no physical contact between the blade and the workpiece occurs. As the blade continues its advance in the Y direction into the workpiece, the effective depth of the kerf 194 increases until it reaches the value "$l_1$". At this point, the cutting current I flows between the blade and the workpiece, provided the blade advancing speed v is selected as above-described. To facilitate the removal of resolidified molten metal particles from the kerf, particularly in instances in which the kerf is relatively long (as when making rip cuts) the blade 8 can be rotated so that it exits kerf 194 at the point 199 where the kerf is being cut as is illustrated in FIG. 6. Arcing occurs substantially homogenously and uniformly over the "arc segment lengths" l, that is the section of blade periphery 202 which is directly opposite and parallel to kerf bottom 198. There is, moreover, an arcing gap "g" between the blade periphery and the kerf bottom. As above-mentioned, the arcing gap is a function of the applied voltage and for a given cutting current, this gap should remain constant.

For a variety of reasons, however, the cutting current fluctuates when v is constant because of variations in the cross-section of the workpiece, discontinuities, such as voids in the workpiece, differences in the workpiece density, the presence of foreign particles in the workpiece material or in the arcing gap, etc. This leads to current variations and can at times cause physical contact between the rotating saw blade periphery and the kerf bottom which can seriously damage either or both, and a shorting of the power source which requires its shut down as well as the shut down of the whole sawing operation.

To prevent such damage and shut downs, the present invention provides a feedback control 206 (see FIG. 10) which includes a current (or voltage) transducer 208 if power supply 68 is a constant voltage (or constant current) supply which continuously monitors the cutting current I (or voltage) and which applies a cutting current (or voltage) magnitude signal to a comparator 210. The second input to the comparator is a current (or voltage) reference signal from a current (or voltage) selector 212. Any difference between the current sensed by transducer 208 and the current selected by selector 212 generates a corresponding difference or error signal that is applied to an arc control error amplifier 216. The error amplifier includes electrical compensation which modifies the error signal to avoid the occurrence of self-induced (and self-defeating) current oscillations. The compensated error signal from the error amplifier 216 is applied via a control logic 218 (further discussed below) to a power amplifier 220 which controls the drive mechanism that advances the blade 8 in the cutting direction. In the above stated example in which the cutting direction is the Y-direction, the blade drive is the Y-direction rack and pinion drive 134.

The just described feedback control 206 thus operates to constantly regulate and, as necessary, change the cutting speed v of blade 8 so as to maintain cutting current I at the selected level, that is substantially constant. In other words, the feedback control 206 is a cutting speed regulator which operates automatically, taking into account the above-discussed current versus cutting speed relationship.

To render the feedback control applicable to all three potential cutting drives, that is to vertical actuator 10 (Z-direction), hydraulic drive 112 or rack and pinion drive 114 (X-direction), as well as to the Y-direction drive 134, control logic 218 is interposed between the comparator and the blade drive so as to apply the compensated error signal to the proper power amplifier and drive mechanism. In this manner a signal feedback control can be employed for advancing the blade in either the X, Y or the Z direction.

Referring still specifically to FIG. 10, for optimum control and operator information, the present invention includes a velocity transducer 222 which senses the cutting speed of blade 8 and a position transducer 228 which senses the instantaneous blade position. In the preferred embodiment a digital X, Y and Z position display is provided which accurately advises the operator of the instantaneous blade position in all three directions.

The output of the position transducer 228 is applied to a comparator 223 which also receives the output from a position selector 224. The error or difference signal generated by comparator 223 is applied to error amplifier 225 and can be used in a position control mode via control logic 218, power amplifier 220 and the Y-direction blade drive 134 to advance the blade to and maintain it at the position set by selector 224.

Similarly, the output of the velocity transducer 222 is applied to a comparator 227 which also receives the output from a velocity selector 226. The error or difference signal generated by comparator 227 is applied to error amplifier 229 and can be used in a velocity control mode via control logic 218, power amplifier 220 and the Y-direction blade drive 134 to advance the blade and maintain the velocity set by velocity selector 226.

From the preceding description, it will be apparent that although the advantages of the present invention can be attained from manually setting the blade cutting speed v in accordance with equation (6), current variations due to factors beyond the operator's control occur constantly. To avoid a shorting of power source 68 or a loss of arcing a sufficiently high voltage would have to be chosen to create an arcing gap "g" which is sufficiently large so that neither occurs. Such a high voltage, normally well above 40–50 volts, however, leads to cuts having a poor quality. The provision of the above-discussed feedback control 206 eliminates this problem.

The criticality of controlling the arcing gap "g" by controlling the current and cutting speed should now be apparent. Referring now to FIGS. 1–10, the blade is subjected to continuous peripheral wear which can cause it to lose its concentricity. An eccentricity of only a few tenths of a mm can lead to a physical contact between the blade periphery and the kerf bottom and short out the power supply. Furthermore, when slitting a workpiece to a partial depth only (as shown in FIG. 6) a blade diameter reduction would lead to a corresponding reduction in the kerf depth "$l_1$" unless compensated for.

To provide such compensation a peripheral blade sensor 230 may be mounted to drive unit 48 and preferably to blade guard 49 thereof, which includes a follower wheel 232. The follower wheel is biased against the blade periphery by a spring 234 and suitably dampened, such as with a piston 236 disposed within a fluid filled cylinder 238 and fitted with fluid passages 240 to prevent the follower wheel from fluttering. As the blade diameter decreases the movement of the follower wheel 232 towards the axis of the blade is transmitted to a transducer 242 which generates an output signal that is responsive to the blade diameter reduction. The output signal of the transducer is then applied to a vertical saw blade position controller 244 which in turn operates a control valve 246 (which may or may not be the same as valve 196 shown in FIG. 6) for raising or lowering the piston by incremental amounts to compensate for peripheral blade wear so that the kerf bottom 198 will remain at a constant depth $l_1$. The controller may further send a signal to a control panel 248 for a visual indication of the instantaneous saw diameter.

In addition to blade diameter losses during operation, the portion of the blade adjacent its periphery 202 has a tendency to deform into a "mushroom" shape as is generally indicated in FIG. 9a. This results in an effective increase in the blade width, causing the cut of a wider kerf, greater power consumption and a change in the cutting speed. To prevent such mushrooming, the present invention contemplates to apply a blade edge dressing tool 250 which comprises a generally U-shaped blade edge cutter 252 mounted to a rigidly disposed feed shaft 254 carried by drive unit 48, preferably the blade guard 49, and actuated by a handle 256. The edge cutter is dimensioned so that its cross-section (see FIG. 9) equals the nominal cross-section of the peripheral blade portion. In this manner, the cross-section of the peripheral blade portion is continuously dressed and maintained constant. Also, the edge cutter prevents the formation of peripheral blade eccentricities due to an uneven blade wear or, for that matter, due to an initial eccentric installation of the blade on drive shaft 52.

FIG. 9 also illustrates the "prestressing" of blade 8 by giving it a dished-in configuration (illustrated in an excavated manner in the lower half of FIG. 9) while the blade is at rest. Such a dished-in configuration can be imparted to a flat blade by rolling a center portion of the blade between two wheels 258 forced against the blade as is schematically illustrated. The blade is prestressed at an amount so that it assumes a flat shape when it rotates at its operating speed, e.g. the above-mentioned 40 m/sec linear blade periphery speed.

We claim:

1. A method for cutting a metal object comprising the steps of providing a saw member; applying a voltage differential between the object and the member; advancing the saw member into close proximity with the object; determining a threshold current $I_o$ between the member and the object which equals $$a \cdot s \cdot 10^6 \text{ amps}$$

wherein
  a is in the range of between about 2 and about 16;
  s is the effective surface area of the cut (arc segment length × kerf width) in m²;
and passing a cutting current I between the member and the object which is at least as large as the threshold current $I_o$ so that cutting of the object through melting of the metal commences substantially instantaneously upon the commencement of current flow between the member and the object.

2. A method according to claim 1 including the step of flowing a cutting current I between the member and the metal which is greater than $I_o$, and advancing the member into the body of the metal at a speed v selected so as to maintain a substantially constant arcing gap g between the member and the object.

3. A method according to claim 2 wherein the step of maintaining the gap g comprises the step of monitoring the current I, and adjusting the speed v so that I remains substantially constant.

4. A method according to claim 3 wherein the instantaneous feed speed $$v = \frac{J - J_o}{M} \text{ in m/sec wherein}$$

J = the current density in amps between the metal and the member;
$J_O = a \cdot 10^6$ amps/m$^2$ between the member and the object;
M = ΔJ/Δv;
ΔJ = an incremental change in the current density (in amps/m$^2$); and
Δv = an incremental change in the speed v (in m/sec) which results from ΔJ.

5. A method according to claim 1 including the step of submerging in water a portion of the object and a portion of the member between which the electric current flows.

6. A method for cutting a kerf through a metal object with a relatively thin disc comprising the steps of applying an electric differential to the object and the disc; rotating the disc; determining a cutting speed v with which the disc is to be moved through the object so that $$v = \left(\frac{I}{s} - J_o\right) \cdot \frac{1}{M} \text{ m/sec wherein}$$

I is the electric cutting current flowing between the saw and the object;
$J_o = a \cdot 10^6$ amps/m$^2$ between the object and the disc;
s = arc segment length (in m) × width of kerf (in m);
a is in the range of 2 to 16
M = ΔJ/Δv;
ΔJ is the incremental increase in the current density corresponding to an incremental increase Δv in the cutting speed of the blade through the object;
advancing the blade relative to the object at a speed not substantially greater than v; and
changing the speed v of the blade through the object so that the current I remains substantially constant.

7. A method according to claim 6 wherein the step of applying the electric differential comprises the step of applying a voltage in the range of between about 15 to about 45 volts.

8. A method according to claim 7 including the step of submerging the object in water while the disc cuts through the object.

9. A method according to claim 8 wherein the step of submerging the object in water comprises the steps of positioning the object relative to the disc, placing a body of water beneath the object, and raising the body of water by ejecting a volume of air into the body of water and maintaining the volume of air in the body of water until the cut through the object has been completed.

10. A method according to claim 9 including the step of discharging the volume of air after the completion of the cut through the object to thereby lower the body of water beneath the object.

11. A method according to claim 6 including the steps of pretensioning the disc so that it has a dished-in configuration in its relaxed state, and rotating the disc at a rate sufficient to elongate its periphery so that the disc assumes a planar shape during the cutting of the object.

12. A method according to claim 6 including the step of rotating the disc in a direction so that a periphery of the disc exits from a kerf cut in the object at the point at which the kerf is being cut.

13. A method for the high speed electric arc cutting of a kerf in a metallic object comprising the steps of providing a circular, metallic cutting disc; rotating the disc about its axis; providing an electric power supply for applying an electric potential to the object and the disc; determining a minimum electric cutting current I which exceeds $$I_o = a \cdot 10^6 \cdot l \cdot w$$

wherein
a is in the range of about 2 to 16
l = arc segment length of the kerf in m; and
w = the width of the kerf in m;
flowing the electric cutting current between the object and the disc; moving the object and the disc relative to each other at a controlled speed to thereby cut a kerf into the object; and varying the speed in response to fluctuations of I to maintain I substantially constant.

14. A method according to claim 13 wherein "a" is about 5.

15. A method according to claim 13 including the step of submerging at least a portion of the object including the kerf in water.

16. A method according to claim 13 wherein I exceeds $I_o$ by a plurality of times.

17. A method according to claim 16 wherein I exceeds $I_o$ by a factor greater than 2.

18. A method according to claim 17 wherein I exceeds $I_o$ by a factor of up to about 40.

19. A method for the high speed cutting of relatively large metal objects by melting a relatively narrow kerf into the object and removing molten metal from the kerf, the method comprising the step of: providing a relatively thin, large diameter metallic disc; rotating the disc; providing an electric power source capable of generating a voltage differential of between about 15 to about 45 volts and a current of at least several thousand amperes; applying the voltage generated by the source to the object and the disc; determining a threshold current $I_o$ for cutting a kerf into the object having a width approximately equal to a thickness of the disc and a desired depth, the threshold current being selected so that it develops a current density in the range of between about 2 to about 16 times $10^6$ amps per meter$^2$; setting the disc relatively closely adjacent to the object and flowing a cutting current I between the disc and the object which exceeds $I_o$ by a factor of at least about 1.5; sensing the actual current flowing between the disc and the object; advancing the disc relative to the object to cut the kerf into the object; and controlling the disc advancing speed with the sensed actual current so as to maintain I substantially constant.

20. A method according to claim 19 including the step of determining the incremental change in the cutting current for an incremental change in the disc advancing speed; and including the step of intermittently varying the cutting current to thereby correspondingly vary the speed.

21. A method according to claim 19 wherein the step of advancing the disc relative to the object is performed in an air atmosphere.

22. A method according to claim 21 including the step of adding a liquid coolant spray to a portion of the disc where cutting occurs.

23. A method according to claim 19 wherein the step of advancing the disc relative to the object is performed while the object is submerged in water.

24. A method according to claim 19 wherein the step of controlling includes the step of varying the advancing disc speed by maintaining an arc gap between a periphery of the disc and a bottom of the kerf substantially constant and in the order of about a few tenths mm.

25. A high speed arc saw for cutting a kerf into a metallic object comprising: an electrically conductive saw blade including means for rotating the blade about its axis; means for determining a threshold current for cutting the kerf into the object having a current density in the range of no less than between about two to 16 times $10^6$ amps per meter$^2$; an electric power source operatively coupled with the blade and the object and adapted to flow a cutting current between them which is no less than the threshold current; feeding means for advancing the saw blade towards and past the object while the cutting current flows between them; means for monitoring the cutting current flow between the blade and the object; control means operatively coupled with the monitoring means and the feeding means for varying the blade advancing speed as a function of the monitored cutting flow so as to maintain the cutting current flow substantially constant while the kerf is being cut; and means for submerging the kerf in water while it is being cut, the submerging means including a water table having a plate for mounting the object, the plate defining an aperture; a gas-water tank disposed below the mounting means, at least an uppermost portion of the tank being gas-tight, the tank including a lower portion adapted to receive a body of water, a tubular riser connecting the aperture in a gas-tight manner with the lower tank portion to define a passageway between the mounting means and the lower tank portion; means for injecting a pressurized gas into the uppermost tank portion; whereby the pressurized gas forces water disposed in the lower tank portion through the tubular riser to the object and thereby submerges the kerf in water; and valve means for optionally applying pressurized gas to the uppermost tank portion and for venting pressurized gas from the uppermost tank portion so that upon the venting of the uppermost tank portion water submerging the kerf returns via the tubular riser to the lower tank portion.

26. Apparatus according to claim 25 wherein the control means includes adjustment means for setting a desired cutting current flow magnitude for cutting the kerf.

27. Apparatus according to claim 26 wherein the control means includes comparator means operatively coupled with the adjustment means and the monitoring means for generating a comparator signal responsive to the difference between the instantaneous cutting current flow sensed by the monitoring means and the cutting current flow magnitude set by the adjustment means; and means responsive to the comparator signal for generating a speed control signal for application to the feeding means to change the blade advancing speed until the set cutting current flow magnitude substantially corresponds to the instantaneous cutting current flow.

28. Apparatus according to claim 27 wherein the control means includes a power amplifier.

29. Apparatus according to claim 27 wherein the control means includes an error amplifier receiving the comparator signal, the error amplifier including means for electrically compensating the comparator signal so as to prevent excessive comparator signal and feed control signal oscillations and to thereby render the control means stable.

30. Apparatus according to claim 25 wherein the plate includes a cutout in the vicinity of the object, and wherein the tank includes means defining a sludge compartment disposed beneath the cutout and sealed from the uppermost and the lower tank portions, and means disposed at a lower section of the compartment for providing access to the compartment from the exterior of the tank.

31. Apparatus according to claim 30 including cleanout openings disposed at a lowermost point of the lower tank portion for providing access to the lower tank portion from the exterior of the tank to facilitate the cleanout of the lower tank portion.

32. Apparatus according to claim 25 wherein the blade has a thickness of no more than about 6.5 mm.

33. Apparatus according to claim 22 wherein the blade has a thickness of between about 1.5 to about 6.5 mm.

34. A high speed arc saw for cutting a kerf into a metallic object comprising: an electrically conductive saw blade including means for rotating the blade about its axis; an electric power source operatively coupled with the blade and the object and adapted to flow a cutting current between them having a current density in the range of no less than between about two to 16 times $10^6$ amps per meter$^2$; feeding means for advancing the saw blade towards and past the object while the cutting current flows between them; means for monitoring the cutting current flow between the blade and the object; control means operatively coupled with he monitoring means and the feeding means for varying the blade advancing speed as a function of the monitored cutting flow so as to maintain the cutting current flow substantially constant while the kerf is being cut; means for mounting the blade; and means for pivoting the blade through an arc of at least 90° about an axis perpendicular to its axis of rotation, the pivoting means comprising a tubular member having a first end mounting the means rotating the blade and a second, remote end, the tubular member being rotatably movable about its axis and defining a double acting piston, and means defining a cylinder for cooperation with the double acting piston.

35. Apparatus according to claim 34 including means for relatively stationarily mounting the cylinder to a support.

36. Apparatus according to claim 34 including means for rotatably indexing and releasably fixing the piston member in at least one operating position of the saw blade.

37. Apparatus according to claim 36 wherein the indexing and fixing means comprises first ring means rotatably secured to the cylinder; at least two arms; means pivotally connecting first ends of the arms to each other and pivotally connecting free second ends of the arms to the ring and to the first end of the tubular member, respectively; the arms and the pivotal connecting means being rigid in the pivot direction of the piston; and means for releasably locking the ring to the cylinder in said operative saw blade position; whereby release of the locking means and rotational movement of the ring results in a corresponding rotational movement of the saw blade about the pivot axis, and engagement of the locking means results in a corresponding locking of the saw blade in an operative position.

38. A high speed arc saw for cutting a kerf into a metallic object comprising:
    table means for holding the object during the cutting operation;
    a cutting head including a relatively thin, disc-shaped saw blade; and means for rotating the saw blade about its axis;
    saw blade advancing means for moving the blade relative to the object, the advancing means including an elongate, tubular piston having a first end mounting the blade and the drive means therefor and a second, remote end; a tubular cylinder receiving the tubular piston and including means defining first and second pressure chambers for reciprocating the piston by correspondingly applying a pressure medium to the chambers; the piston and the cylinder being constructed so that the piston can be rotated about its axis through an arc of at least 90°;
    indexing means operatively connected to the cylinder and the piston for rotatably moving the piston between at least two operative saw blade positions spaced-apart by an arc of 90° and for locking the piston in the respective operative saw blade positions;
    a support for mounting the cylinder in relation to the table means; and
    an electric power source operatively coupled with the blade and the object for flowing a high amperage current between the blade and the object while the blade cuts the kerf and for establishing an arcing gap between a periphery of the blade at a bottom of the kerf in the order of a few tenths of an mm.

39. An arc saw according to claim 38 wherein the axis of the tubular piston is vertically oriented; wherein the rotating means comprises a motor coupled with the blade; and including a power supply line for the motor and an electric busbar electrically coupling the blade with the power source, the power supply line and the busbar being disposed interiorly of and extending over a major portion of the length of the tubular piston.

40. An arc saw according to claim 39 wherein the indexing means comprises ring means rotatable about the cylinder and defining a first pivot axis that is perpendicular to and radially spaced from the piston axis; means attached to the tubular piston defining a second pivot axis that is parallel to the first axis; and first and second pivot arms having first ends pivotally connected to each other, second ends pivotally connected to the first and second pivot axes, and extending obliquely and radially away from the axis of the piston and the cylinder; the first and second pivot arms and the first and second pivot axes being rigid about the axis of rotation of the tubular piston; whereby the piston and therewith the saw blade can be placed in the operative position and can further be vertically raised and lowered by axially moving the piston relative to the cylinder.

41. An arc saw according to claim 40 including a source of pressurized fluid operatively coupled with the cylinder chambers for raising or lowering the piston; means for sensing changes in the diameter of the blade during operation; and means operatively coupled with the pressurized fluid source and the sensing means for moving the piston relative to the cylinder to compensate for the blade diameter changes.

42. An arc saw according to claim 38 wherein the table means is defined by a substantially horizontal plate including means for securing the object to the plate; an airtight tank disposed beneath the plate for receiving a body of water; at least one riser tube communicating a side of the plate to which the object is secured with a lower portion of the tank; and means for injecting into and venting from an upper portion of the tank pressurized air; whereby the injection of air causes a rise of the water to said plate side and submerges the object in water so that the blade cuts the kerf under water, and a venting of the air causes a return of the water from above said plate side to the lower tank portion.

43. An arc saw according to claim 38 wherein the saw blade advancing means includes means for advancing the saw blade through the object at a controlled speed; and control means operatively coupled with the electric power source and with the saw blade advancing means for varying the blade advancing speed so as to maintain the current flowing between the blade and the object substantially constant.

44. A method for cutting a metal object comprising the steps of providing a saw member; applying a voltage differential between the object and the member; advancing the saw member into close proximity with the object; calculating a threshold current $I_o$ between the member and the object which equals $$a \cdot s \cdot 10^6 \text{ amps}$$

wherein
  a is in the range of between about 2 and about 16;
  s is the effective surface area of the cut (arc segment length × kerf width) in m²;
  and passing a cutting current I between the member and the object which is at least as large as the threshold current $I_o$ so that cutting of the object through melting of the metal commences substantially instantaneously upon the commencement of current flow between the member and the object.

* * * * *